United States Patent Office 3,184,973
Patented May 25, 1965

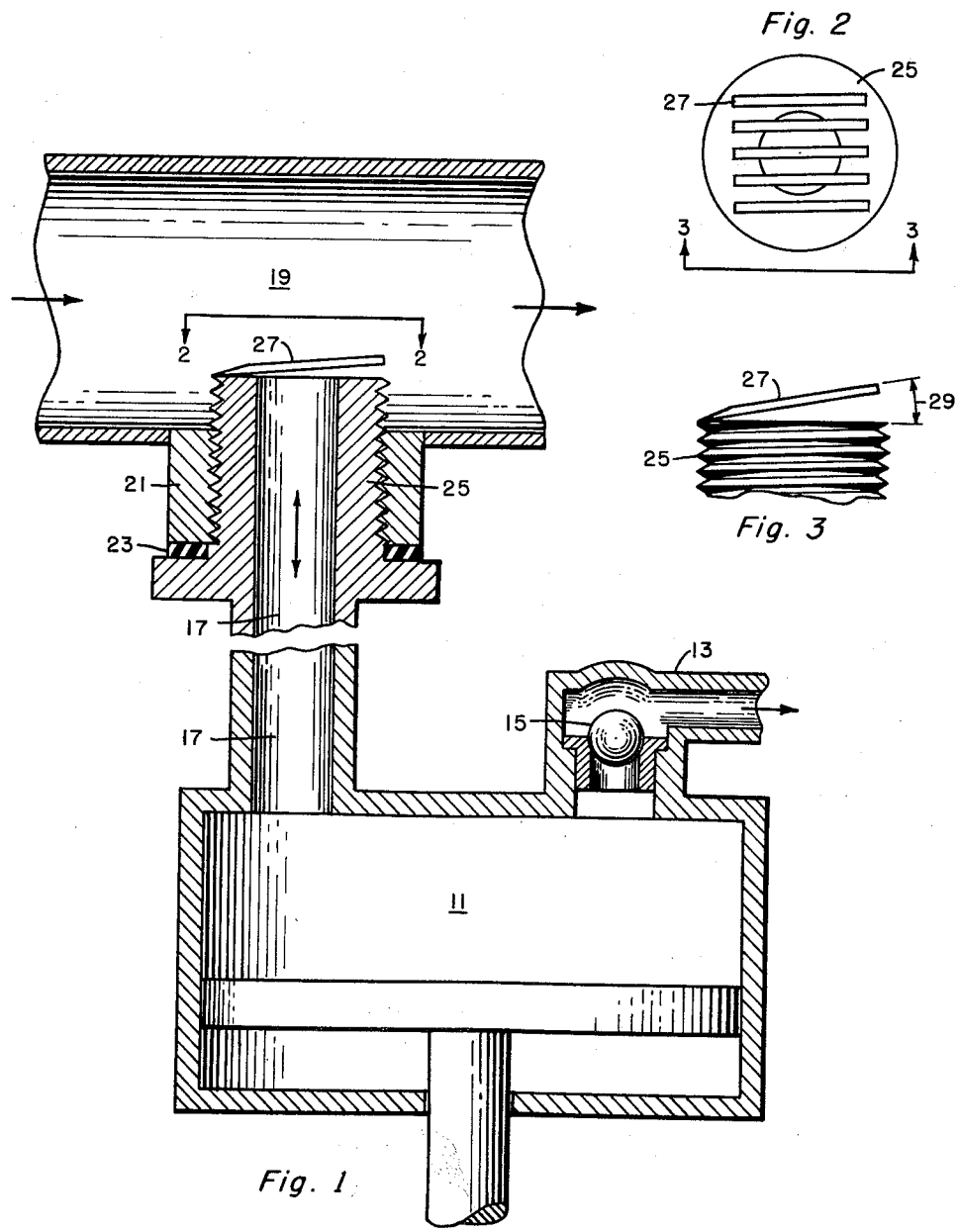

3,184,973
MUD SAMPLE PUMP
John S. Bradley, Dallas, Tex., assignor to The Atlantic Refining Company, Philadelphia, Pa., a corporation of Pennsylvania
Filed Nov. 29, 1961, Ser. No. 155,557
3 Claims. (Cl. 73—422)

This invention relates to geochemical drilling fluid investigation techniques. More specifically, this invention pertains to a novel drilling fluid sampling system especially advantageous for sampling drilling fluids containing relatively large solid particles.

One method for investigating stratigraphic sections for petroliferous deposits is to analyze gases and other chemical changes in the drilling fluid which is employed in earth borehole drilling by circulating the fluid into and out of the borehole. This is commonly called chemical mud logging. In such process, normally some portion of the outflowing drilling fluid is continuously passed through a degassing and settling system so that hydrocarbon gases entrapped or dissolved in the drilling fluid are separated from such fluid for analysis. In many instances, it is also necessary to sample both the inflowing and outflowing drilling fluid so that a comparison of the two may be made. In either instance, the drilling fluid may contain appreciable amounts of relatively large solid particles, such as lost circulation control material, which solid particles interfere with the operation of the sampling system and the degasser. These materials frequently plug the sampling system thereby disrupting the continuity and uniformity of the flow rate of the drilling fluid samples. For example, frequently, the mud sampling stream is sprayed into a degasser compartment and such particles will plug the sprayers. Similarly, such particles frequently plug the sampling lines and valves of the pump. If attempts are made to filter the samples of mud before they enter the mud sampling pump, such particles, especially high concentrations of lost circulation control material, quickly plug the filters or at least quickly change the flow rate through the pump so that it is difficult, if not impossible, to accurately correlate the chemical logging results with the depth of the borehole. Because of this, it is highly desirable to provide a chemical well logging pump that can operate continuously over long periods of time to provide a relatively steady flow of mud to the sampling and testing system. It is also desirable that such flow be steady and adjustable to conform to the analyzing and degassing system.

Accordingly, it is an object of this invention to provide an improved mud sampling apparatus and method.

Another object of this invention is to provide a mud sampling system wherein the flow of mud is continuous and relatively steady.

Still another object of this invention is to provide means for preventing large particles from entering the sampling pump.

Still another object of this invention is to provide a drilling fluid sampling system especially suited to chemical mud logging of drilling fluids containing lost circulation control materials.

Yet another object of this invention is to provide a self-cleaning mud sampling pump and method of operating same.

Yet a further object of this invention is to provide a strainer especially created to facilitate the self-cleaning action of a mud sampling pump.

In brief, in accordance with the present invention, the above and other objects of this invention are achieved by a sampling pump means which backflows a portion of the sampled drilling fluid through the intake means of the pump means thereby preventing plugging of the intake means. In the preferred embodiment of this invention, the intake means includes a straining surface means especially designed and positioned to be cleaned by the flow of drilling fluid, as hereinafter described.

For a better understanding of this invention, attention is now directed to the following description, accompanying drawing and the appended claims wherein the features of this invention are specifically pointed out.

In the drawing,

FIGURE 1 is a fragmented, elevational, cross-sectional view of the preferred mud sampling system of this invention.

FIGURE 2 is a horizontal view of the strainer of this invention taken on line 2—2.

FIGURE 3 is a longitudinal view of the strainer of FIGURE 2 taken at line 3—3.

Referring now to the drawing, in FIGURE 1 there is shown pump means 11 which, except as hereinafter limited or described, is any form of pump that discharges the fluids out of the pump in such manner as to subject the inlet system to the discharge fluid pressure. Pump means 11 is, therefore, either a modified reciprocating, diaphragm, piston or other similar type pump. Preferably, pumping means 11 should have variable output, displacement or adjustable length stroke so that the flow rate through the pump is controllable. Except as hereinafter shown, such pumping systems are well known to the art.

Pump means 11 has a chamber having outlet passage means 13 which fluidly connects the chamber of pump means 11 with a drilling fluid testing system (not shown). In outlet means 13 is valve means 15 which is any form of valve which permits flow of fluid in only one direction, e.g., from the pump means to the testing system, but prevents flow in the opposite direction, i.e., from the testing system to the pump means. As shown, valve means 15 is a ball valve, but valve means 15 could be a flapper valve or a rubber ring valve or any other type of suitable backflow check valve. Unlike standard pumping equipment, it is herein preferred that valve means 15 be a loose fitting, simple ball valve whose seat will not be damaged by the drilling fluid and whose operation will not be hampered by solid particles in the drilling fluid samples. In standard pumping systems, it is common practice to make such valves with close tolerance; consequently, standard pumps are highly subject to malfunction when sampling a drilling fluid.

Pump means 11 also has inlet passage means 17 which fluidly connects the chamber of pump means 11 with a drilling fluid reservoir means illustrated by flowline 19 through which drilling fluid is flowing in the direction illustrated. Inlet passage means 17 is unique in that there is no valve means therein which opens and closes the inlet passage as pump means 11 operates. In standard pumps of this type, there is a valve in the inlet passage designed to permit flow of fluid into the pump but not out of the pump. Inlet passage means 17 is, therefore, always in fluid communication with the inside of flowline 19 and the chamber of pump means 11 when the pump is being operated.

As shown, inlet passage 17 is connected to flowline 19 by way of threaded pipe tap 21 and seal ring 23. The connection to flowline 19 should be in such manner that the end of inlet passage means 17 may extend into flowline 19 for reasons hereinafter made apparent. Subject to this limitation any standard form of T or side connection may be used.

The segment of inlet passage means 17 connected to flowline 19 will be comprised of flow restrictive means 25. Flow restrictive means 25 has straining surface 27 designed to prevent large solid particles from entering inlet passage means 17. Straining surface 27 has unique features that cooperate with the direction of flow of drilling fluid in inlet passage means 17 and in flowline 19 to render the straining surface self-cleaning.

Referring now to FIGURES 1, 2 and 3, some of the preferred features of straining surface 27 are illustrated. First, we will consider flow restrictive means 25 and straining surface 27 as though they were any form of straining device, and then consideration will be given to the details of the straining surface as shown in the drawing. All of the features herein illustrated are only applicable when a pump means and inlet means similar to that just described are employed as each feature is especially suited to cooperate with the type of pumping system of this invention.

It has been found that regardless of the type of straining surface used that the operation of the straining surface on backwash (as hereinafter described) is improved if the openings or opening in the straining surface are as large as permissible and still prevent entry of the particles into the pump means. Such openings or opening should be between 0.02 inch and 0.5 inch and preferably between 0.1 and 0.25 inch. The preferred size is partially dependent on the number of openings and the size or flow resistance of outlet passage means 13.

It has also been found that straining surface 27 should be placed directly in the flowing drilling fluid in flowline 19. The straining surface should be placed in this manner so that particles collecting on the straining surface will form a layer that offers resistance to the flow of fluid and the resulting force created against the particles will tend to sweep them from the straining surface. In this manner, the backwashing fluid and the normally flowing drilling fluid act at angles to each other on the particles and this creates a resultant force that both lifts and sweeps the particles from over the straining surface.

The same principles are involved in another feature of this invention. It has been discovered that this combined cleaning action of drilling fluid flowing in flowline 19 and backflowing in inlet passage means 17 is enhanced when straining surface 27 is slanted or tilted so that the lowest edge of straining surface 27 is contacted by drilling fluid before the upper edge. In other words, straining surface 27 should be inclined upwardly and rearwardly to the direction of flow of the drilling fluid in flowline 19 and the straining surface should lie in one plane. Angle 29 formed by straining surface 27 and a plane parallel to the direction of flow should not exceed 25 degrees as the efficiency of the cleaning action declines when a greater slope is used. Preferably, angle 29 should be between 1 degree and 15 degrees with the optimum usually between 5 and 10 degrees. The actual optimum is partially dependent on the nature of the particles being screened or strained from the drilling fluid and the relative flow rates of the drilling fluid and backwash. For example, some particles are fibrous and tend to mat or interweave with each other while other particles are relatively hard and dense.

Referring now to the optimum straining surface configuration, particular attention should be given to FIGURES 2 and 3. Straining surface 27 is formed by a row of slender parallel bars of circular, square, or parallelogram cross section and whose longitudinal axis is either parallel to or aligned with the direction of flow of drilling fluid in flowline 19. The bars traverse the bore passage of inlet passage means 17 and are spaced so that the opening between the bars correspond to the requirements previously described. Such bar-like configuration is herein called a grizzly.

For optimum cleaning and efficient operation, the bars of the grizzly should be aligned with the flow of drilling fluid. In this manner, there is no tendency of the particles to mat and catch on the bars and drilling fluid can pass through, against and under the particles to sweep them from the straining surface.

Preferably, the bars should be sloped as described previously with the optimum angle between 5 and 10 degrees. FIGURE 3 also shows another preferred feature of this invention. Preferably, the trailing or upper ends of the bars of straining surface 27 should be open or unconnected to strainer unit 25 and the edge of the strainer unit parallel to the direction of flow of drilling fluid in flowline 19. In this manner, since the bars slope upward and rearward to the flowing drilling fluid and the trailing ends of the bars are open, the cleaning action of the drilling fluid is greatly improved. Using this preferred straining system, pumping means 11 operated for long periods without straining surface 27 plugging. For example, samples were collected from a 9.0 pounds per gallon drilling mud containing 11.8 pounds per barrel of different lost circulation control materials (e.g., ground walnut shells, leather, mica, fibrous blend and the like) over a number of two hour periods without a single interruption in the flow of sampled fluid. Previous standard systems operating under similar circumstances and flow rates would not operate for longer than one hour and often clogged in a few minutes.

Of course, with proper sizing and balancing of the system, more than one intake passage means and outlet means may be used and the invention is intended to cover such multiple arrangements. For example, in some systems the outflowing mud may be divided by certain mud handling equipment and a sample from each stream may be taken and a sample from each stream may be taken and combined into one sample. Moreover, it may be desirable to combine samples from two spaced apart points on the outflowing mud or drilling fluid stream.

In operating the above-described sample pumping system when it is desirable to chemically log a drilling fluid containing relatively large solid particles, a pumping means having at least one outlet means and at least one intake means is connected between at least one reservoir means and a drilling fluid testing system. Drilling fluid is circulated through the reservoir means. As the drilling fluid flows through the at least one reservoir means, portions of the drilling fluid are drawn from the reservoir into said pumping means, and the relatively large solid particles are removed from the drilling fluid entering the pumping means. The solid particles are collected on the intake means of the pumping means. Periodically, the drilling fluid is forced out of the pumping means through both the intake and outlet of the pumping means. The drilling fluid flowing out of the intake means removes the relatively large particles from the intake means causing them to re-enter the drilling fluid flowing in the reservoir means. The drilling fluids flowing out of the outlet means of the pumping means are tested in such manner as to indicate the presence of petroliferous deposits in stratigraphic sections.

The operation set forth above involves employing part of the fluids in a pump means to clean the intake of the pump means when sampling drilling fluids containing relatively large solid particles during chemical mud logging. In this system, a sampling pump means is connected between a reservoir means carrying drilling fluid and a drilling fluid sample receiving system. Drilling fluid is drawn from the reservoir means to the pump means. The relatively large solid particles in the drilling fluid are removed from the drilling fluid entering the intake of the pump means and are collected thereon. The drilling fluid in the pump means is forced through both the intake and outlet of the pump means. The fluid forced out of the intake removes the particles collected thereon by causing them to re-enter the drilling fluid flowing in the reservoir means. This procedure, thereby, cleans the intake of the pump means.

In carrying out the above operation, the outlet of the pump means leading to the sample testing system or sample receiving system is closed on the intake stroke or pulse of the pump means and drilling fluid is drawn from the reservoir to the pump means. The relatively large solid particles in the drilling fluid are removed from the drilling fluid entering the intake of the pump means and are collected thereon. The outlet of the pump means is opened during the exhaust stroke of the pump means and the drilling fluid in the pump means is forced through both the intake and outlet of the pump means. The fluid forced out of the intake removes the particles collected on the intake and causes them to re-enter the drilling fluid thereby cleaning the intake of the pump means during the exhaust stroke thereof.

While this invention has been set forth in detail for purposes of illustrating the preferred embodiments thereof, it will be understood by those skilled in the art that many of the details may be varied without departing from the spirit and scope of this invention and that this invention intends to cover such variations.

I claim:

1. A system for obtaining fluid samples from reservoir means having drilling fluid flowing therethrough, said drilling fluid carrying particle-form solids and being used in earth borehole drilling, which system comprises in combination a pump means having a chamber into which drilling fluid is drawn during the intake stroke of said pump means and out of which drilling fluid is forced during the exhaust stroke of said pump means, first passage means fluidly communicating with said chamber in said pump means and a sample receiving means, one-way valve means in said first passage adapted to remain open during said exhaust stroke of said pump means, second passage means connecting said reservoir means with said chamber in said pump means, said second passage means being adapted to permit the passage of drilling fluid therethrough during both the intake and exhaust strokes of said pump means, and straining surface means in said reservoir means adapted to block the passage of at least part of said particle-form solids in said drilling fluid, said straining surface means being formed by a row of parallel bars aligned with the direction of flow of said drilling fluid, said bars being spaced so that said drilling fluid may flow therebetween and traversing the opening in the end of said second passage means.

2. The system of claim 1 wherein the parallel bars are slanted upwardly and rearwardly of the direction of flow of said drilling fluid in said reservoir means.

3. The system of claim 2 wherein the angle between the parallel bars and said direction of flow of said drilling fluid is between 1 and 25 degrees.

References Cited by the Examiner

UNITED STATES PATENTS

| | | | |
|---|---|---|---|
| 849,916 | 4/07 | McKeen | 230—24 |
| 1,628,657 | 5/27 | Dorner | 103—166.5 |
| 2,260,419 | 10/41 | Wrightsman | 73—422 |
| 2,277,714 | 3/42 | Polston et al. | 73—422 |
| 2,362,750 | 11/44 | Hayward | 103—204 |
| 2,406,192 | 8/46 | Cantrell. | |

RICHARD C. QUEISSER, *Primary Examiner.*

DAVID SCHONBERG, *Examiner.*